US012435662B2

(12) United States Patent
Jochman (10) Patent No.: US 12,435,662 B2
(45) Date of Patent: Oct. 7, 2025

(54) POWER SYSTEMS AND LIFT STRUCTURES FOR POWER SYSTEMS

(71) Applicant: Illinois Tool Works Inc., Glenview, IL (US)

(72) Inventor: Nathan Joe Jochman, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 205 days.

(21) Appl. No.: 17/854,939

(22) Filed: Jun. 30, 2022

(65) Prior Publication Data

US 2024/0001494 A1   Jan. 4, 2024

(51) Int. Cl.
*F02B 63/04* (2006.01)
*B23K 37/02* (2006.01)
*F16M 3/00* (2006.01)

(52) U.S. Cl.
CPC ........ *F02B 63/044* (2013.01); *B23K 37/0282* (2013.01); *F02B 63/048* (2013.01); *F16M 3/00* (2013.01); *F02B 2063/045* (2013.01); *F02B 63/047* (2013.01)

(58) Field of Classification Search
CPC .... B23K 37/0282; F02B 63/04; F02B 63/044; F02B 2063/045; F02B 63/047; F02B 63/048; F02B 2063/046; F16M 5/00; F16M 3/00
USPC ........................................................ 248/637
See application file for complete search history.

(56) References Cited

U.S. PATENT DOCUMENTS

| | | | | |
|---|---|---|---|---|
| 2,141,954 A | * | 12/1938 | Jones ..................... | A47B 91/02 312/351.3 |
| 2,917,266 A | * | 12/1959 | Sanborn ............... | H05K 7/1412 248/507 |
| 4,671,724 A | * | 6/1987 | Bolton ..................... | B66C 1/64 414/10 |
| 5,310,152 A | * | 5/1994 | O'Neill .................. | A47B 81/06 248/329 |
| 5,423,395 A | * | 6/1995 | Kieffer .................. | F04C 29/066 181/279 |
| 5,437,426 A | * | 8/1995 | MacDonald ........... | A47B 57/42 248/222.13 |

(Continued)

FOREIGN PATENT DOCUMENTS

| | | | | |
|---|---|---|---|---|
| CA | 3151156 A1 | * | 9/2022 | ............. B23K 9/133 |
| CA | 3204453 A1 | * | 12/2023 | ......... B23K 37/0241 |

(Continued)

*Primary Examiner* — Taylor Morris
(74) *Attorney, Agent, or Firm* — McAndrews, Held & Malloy, Ltd.

(57) ABSTRACT

Disclosed systems include an enclosure comprising a base, a lift structure coupled to the base and comprising a first leg, a second leg, and a cross member, and one or more of, within the enclosure, an engine, a generator configured to convert mechanical power to electrical power, welding-type conversion circuitry configured to convert electrical power to welding-type power, an air compressor configured to output compressed air, a hydraulic pump configured to generate hydraulic flow, or auxiliary power conversion circuitry configured to convert electrical to at least one of AC output power or DC output power. The cross member, the first leg, and the second leg of the lift structure are a one piece structure.

20 Claims, 8 Drawing Sheets

(56) References Cited

U.S. PATENT DOCUMENTS

| | | | | |
|---|---|---|---|---|
| 5,734,148 A * | 3/1998 | Latvis | | B23K 9/32 |
| | | | | 403/375 |
| 5,809,649 A * | 9/1998 | Kostermeier | | B21D 53/28 |
| | | | | 72/110 |
| 5,927,668 A * | 7/1999 | Cyrell | | F16M 11/14 |
| | | | | 248/316.1 |
| 5,928,535 A * | 7/1999 | Trinkner | | F02B 67/00 |
| | | | | 219/133 |
| 6,232,576 B1 * | 5/2001 | Bankstahl | | B23K 9/32 |
| | | | | 294/215 |
| 6,313,986 B1 * | 11/2001 | Jang | | G06F 1/18 |
| | | | | 361/756 |
| 6,474,128 B1 * | 11/2002 | Liu | | B21D 5/16 |
| | | | | 72/379.2 |
| 6,674,046 B2 * | 1/2004 | Bankstahl | | B23K 9/32 |
| | | | | 219/133 |
| 7,198,245 B2 * | 4/2007 | Chosei | | F02B 63/04 |
| | | | | 248/637 |
| 7,411,153 B2 * | 8/2008 | Radtke | | B23K 9/10 |
| | | | | 16/268 |
| 7,642,665 B2 * | 1/2010 | Konop | | F02B 63/047 |
| | | | | 290/22 |
| 7,868,269 B2 * | 1/2011 | Silvestro | | B23K 9/323 |
| | | | | 219/133 |
| 8,282,363 B2 * | 10/2012 | Ohi | | F04B 41/02 |
| | | | | 417/423.15 |
| 8,456,814 B2 * | 6/2013 | Gerovac | | H02B 1/38 |
| | | | | 361/679.01 |
| 8,461,483 B2 * | 6/2013 | Farah | | B23K 9/1006 |
| | | | | 219/133 |
| 8,546,963 B2 * | 10/2013 | Peacock | | F02B 63/04 |
| | | | | 123/3 |
| 8,922,032 B2 * | 12/2014 | Hiranuma | | F01P 1/06 |
| | | | | 290/1 A |
| 8,935,995 B1 * | 1/2015 | Hawkins | | F02B 63/048 |
| | | | | 123/3 |
| 8,960,708 B2 * | 2/2015 | Ziebert | | F02B 63/044 |
| | | | | 123/3 |
| 9,121,400 B1 * | 9/2015 | Myers | | F04B 53/1047 |
| 9,267,431 B2 * | 2/2016 | Takahashi | | F02B 63/04 |
| 9,371,953 B2 * | 6/2016 | Spratt | | F02B 63/044 |
| 9,517,525 B2 * | 12/2016 | Peterson | | B23K 9/1006 |
| 9,554,482 B2 * | 1/2017 | Wilson | | H05K 5/03 |
| 11,027,605 B1 * | 6/2021 | Myers | | F16F 15/06 |
| 11,204,022 B2 * | 12/2021 | Westling | | F04B 39/123 |
| 11,668,234 B1 * | 6/2023 | Reyna | | F02B 63/04 |
| | | | | 290/51 |
| 2003/0136773 A1 * | 7/2003 | Bogner | | B23K 9/32 |
| | | | | 219/136 |
| 2005/0151374 A1 * | 7/2005 | Ambrose | | B23K 9/323 |
| | | | | 290/1 A |
| 2006/0104836 A1 * | 5/2006 | Phillips | | F04B 41/02 |
| | | | | 417/410.1 |
| 2006/0228228 A1 * | 10/2006 | Wesolowski | | F04D 13/02 |
| | | | | 417/234 |
| 2011/0204013 A1 * | 8/2011 | Lahti | | B23K 37/0294 |
| | | | | 211/85.8 |
| 2015/0129568 A1 * | 5/2015 | Miller | | B23K 37/0294 |
| | | | | 219/137.2 |
| 2018/0073672 A1 * | 3/2018 | Varner | | F04B 53/22 |
| 2018/0251292 A1 * | 9/2018 | Marchini | | B65D 88/00 |
| 2022/0097114 A1 * | 3/2022 | Lee | | B21D 53/88 |
| 2022/0260199 A1 * | 8/2022 | Dale | | F16M 5/00 |

FOREIGN PATENT DOCUMENTS

| | | | | |
|---|---|---|---|---|
| CN | 110685798 A | * | 1/2020 | F01M 5/002 |
| DE | 102016125564 A1 | * | 2/2018 | B23K 9/235 |
| JP | S539942 A | * | 1/1978 | F02B 63/04 |
| JP | H0968025 A | * | 3/1997 | F02B 2063/045 |
| JP | 2000186563 A | * | 7/2000 | F02B 63/04 |
| WO | WO-2011106319 A1 | * | 9/2011 | B23K 37/0294 |
| WO | WO-2013053028 A1 | * | 4/2013 | F02B 63/00 |

* cited by examiner

POWER SYSTEMS AND LIFT STRUCTURES FOR POWER SYSTEMS

FIELD OF THE DISCLOSURE

This disclosure is directed generally to power systems and, more particularly, to lift structures for power systems.

BACKGROUND

Conventionally, engine-driven power systems (e.g., generators/air compressors/welders) are contained within a metal enclosure that provides environmental protection for the equipment and provides a safety, sound, and aesthetic barrier for the operators. Power systems often include a lift structure that enables the power system to be lifted or moved via crane or other heavy lifting equipment.

SUMMARY

A lift structure of a system, substantially as illustrated by and described in connection with at least one of the figures.

BRIEF DESCRIPTION OF THE DRAWINGS

The features of the present disclosure will best be understood from a detailed description of the invention and a preferred embodiment thereof selected for the purposes of illustration and shown in the accompanying drawings.

The figures are not necessarily to scale. Where appropriate, similar or identical reference numbers are used to refer to similar or identical components.

DETAILED DESCRIPTION

Conventional engine-driven power systems, which generate and output one or more types of mechanical, electrical, pneumatic, hydraulic, and/or other types of power, are typically housed within an enclosure. Such power systems are relatively heavy and typically require machinery to be lifted or moved. To make moving the power systems easier, many power systems include a lift structure. For example, in some cases, at least a portion of the lift structure may be within the enclosure, and a connection point or loop of the lift structure extends outside of the enclosure. The loop portion may be used to lift or move the power system. For instance, a cable or a lift truck fork may be inserted through the loop portion to lift the power system. In conventional power systems, the lift structure is typically made of multiple pieces of metal that are bolted, welded, or otherwise coupled together to form the lift structure that couples to the enclosure or a base of the power system.

Power systems disclosed herein include a lift structure that is a one piece structure (e.g., not multiple components bolted, welded, etc. together). Such a one piece lift structure may be simpler, cheaper, and less time consuming to manufacture and may better utilize raw materials to form the lift structure (e.g., result in less wasted material). Moreover, the unitary lift structure as disclosed herein may be stronger than conventional, multi-piece lift structures due to features such as, for example, a bend on a top edge of the lift structure, an offset flange, stepped end portions, etc. In turn, the lift structures disclosed herein may be more efficient to produce, while maintaining (or surpassing) the strength of conventional lift structures for power systems.

Although the disclosure is described with respect to a power system, other systems or devices may benefit from the advantages of the lift structure described herein. Thus, the disclosure is in no way limited to for use with power systems. For example, a welding system, a generator, a pump, or the like may benefit from a one piece lift structure as described herein.

Figure 1:
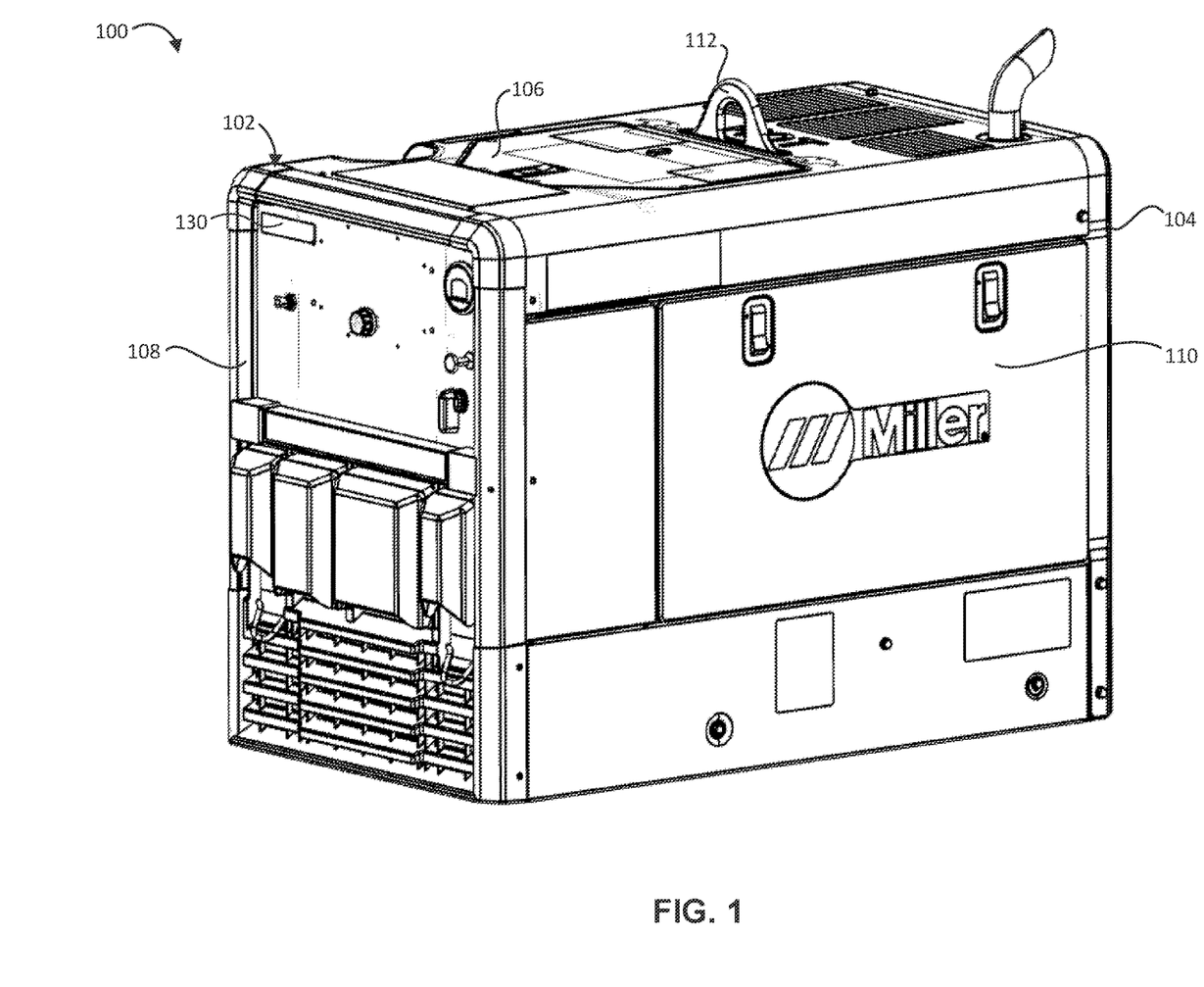
FIG. 1 is a perspective view of an example power system including a lift structure.

FIG. 1 is a perspective view of an example power system 100 including a lift structure 112. The power system 100 may be used for various applications, such as, for example, providing compressed air, generating power, pumping, and/or welding support. As illustrated in FIG. 1, the power system 100 includes an enclosure 102. The enclosure 102 protects internal components of the power system 100 from the environment, as well as providing a safety, sound, and aesthetic barrier for an operator using or within range of the power system 100. The enclosure 102 is primarily constructed with sheet metal, and may include multiple panels. For example, the enclosure 102 may include the rear surface 104, a top surface 106, a front surface 108, and side surfaces 110 when installed in a predetermined orientation (e.g., when the power system 100 is installed in accordance with the power system's 100 intended use). One or more of the rear surface 104, the top surface 106, the front surface 108, or the side surfaces 110 may include multiple panels. One or more of the panels may be removable and/or one or more of the panels may open, to permit access. In other examples, one or more surfaces may include a single, unitary panel.

The power system 100 includes a lift structure 112. In some examples, a portion of the lift structure 112 is external to the enclosure 102. The portion of the lift structure 112 that is external to the enclosure 102 is the only part of the lift structure 112 visible in FIG. 1. As discussed in more detail below, the remainder of the lift structure 112 may be within the enclosure 102. In other examples, additional or alternative portions (or the entirety) of the lift structure 112 may be external to the enclosure 102.

As discussed below, the lift structure 112 is coupled to the enclosure 102 or a base of the power system 100 and is capable of supporting the weight of the power system when lifted. For example, the lift structure 112 may be lifted by the portion that is external to the enclosure 102 to be moved (e.g., translated, rotated, lifted vertically, etc.).

Figure 2:
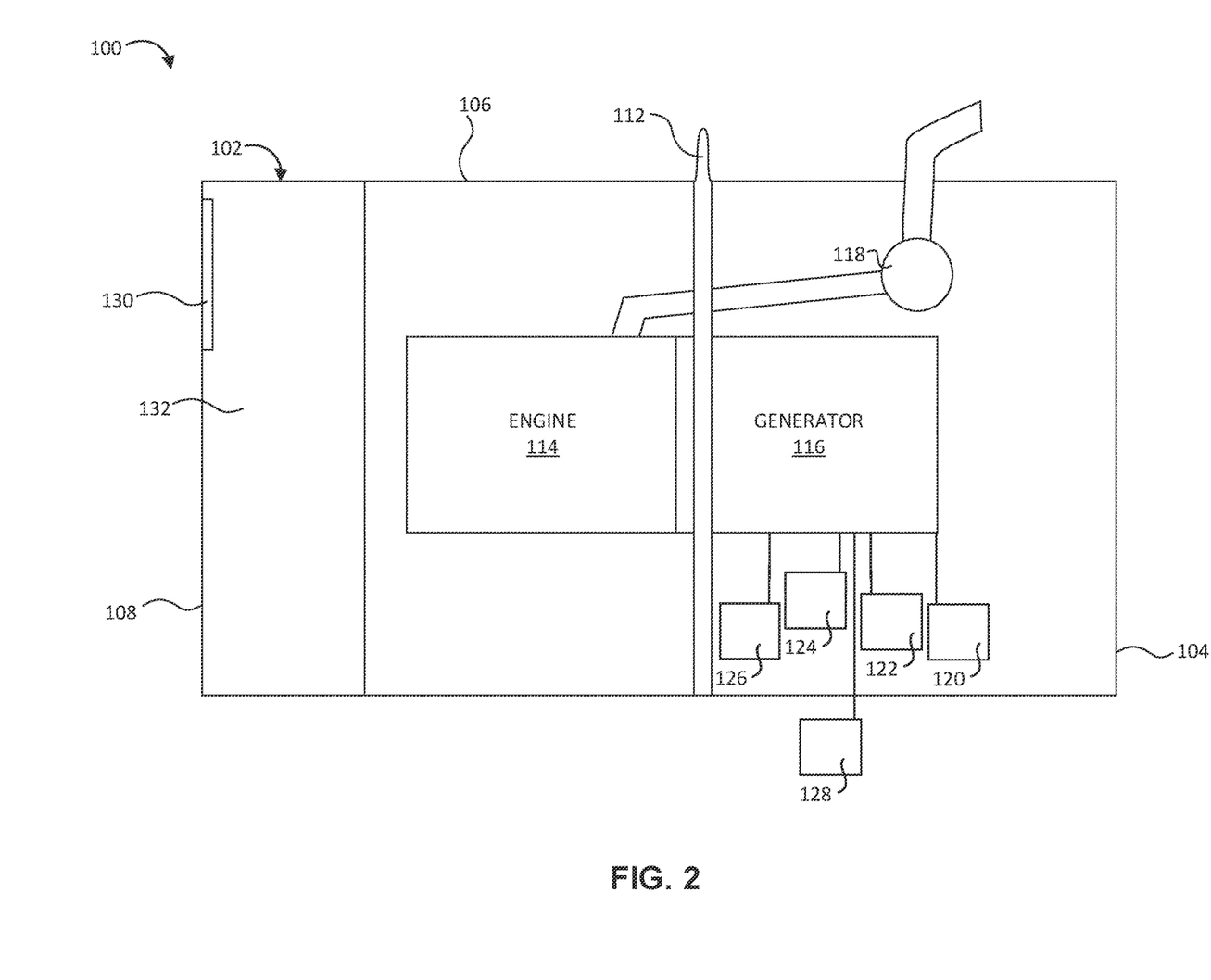
FIG. 2 is a block diagram of the example power system of FIG. 1.

FIG. 2 is a block diagram of the example power system 100 of FIG. 1. The example power system 100 may include other components not specifically discussed herein, or may omit one or more of the components discussed herein. The components of the power system 100 may be arranged within the enclosure 102 in any suitable configuration. The example power system 100 of FIG. 2 is an engine-driven power system. The system 100 includes an engine 114 that drives a generator 116 to generate electrical power. The engine 114 may be an internal combustion engine, a diesel engine, a fuel cell, etc. The engine 114 is configured to output mechanical power to drive the generator 116. The engine 114 receives fuel from a fuel tank.

In some examples, the power system 100 includes one or more power subsystems. For example, the generator 116 may provide the electrical power to welding-type conversion circuitry 120 configured to output welding-type power, an air compressor 122 configured to output pneumatic power, a hydraulic pump 124 configured to output hydraulic flow, auxiliary power conversion circuitry 126 configured to output AC power and/or DC power (e.g., DC and/or AC electrical output(s)), and/or any other load device. The example hydraulic pump 124 and the air compressor 122 may be powered by mechanical power from the engine 114 and/or by electrical power from the generator 116.

In some examples, an external power supply subsystem 128 may be coupled (e.g., plugged in, hardwired, etc.) to the power system 100 to convert at least one of the AC power or the DC power from the auxiliary power conversion circuitry 126 and/or the generator 116 to at least one of AC power or DC power, such as to power external devices that have different power requirements. The example external power supply subsystem 128 may also be communicatively coupled to control circuitry 132 of the power system 100 (e.g., wirelessly, via power line communication, via a communication cable, etc.) to enable the control circuitry 132 to control the demand and/or output of the external power supply subsystem 128.

The welding-type conversion circuitry 120 converts output power from the generator 116 (e.g., via the intermediate voltage bus) to welding-type power based on a commanded welding-type output. The welding-type conversion circuitry 120 provides current at a desired voltage to an electrode and a workpiece via output terminals to perform a welding-type operation. The welding-type conversion circuitry 120 may include, for example, a switched mode power supply or an inverter fed from an intermediate voltage bus. The welding-type conversion circuitry 120 may include a direct connection from a power circuit to the output (such as to the weld studs), and/or an indirect connection through power processing circuitry such as filters, converters, transformers, rectifiers, etc.

The auxiliary power conversion circuitry 126 converts output power from the generator 116 (e.g., via the intermediate voltage bus) to AC power (e.g., 120 VAC, 240 VAC, 50 Hz, 60 Hz, etc.) and/or DC power (e.g., 12 VDC, 24 VDC, battery charging power, etc.). The auxiliary power conversion circuitry 126 outputs one or more AC power outputs (e.g., AC outlets or receptacles) and/or one or more DC power outputs (e.g., DC outlets or receptacle). The power system 100 enables multiple ones of the power subsystems (e.g., the hydraulic pump, the air compressor 122, the welding-type conversion circuitry 120, the auxiliary power conversion circuitry 126, the external power supply subsystem 128, etc.) to be operated simultaneously.

In some examples, the power system 100 includes a user interface 130. The user interface 130 includes an input device configured to receive inputs selecting mode(s) representative of welding-type processes, mode(s) representative of one or more battery charging modes, mode(s) representative of a vehicle load, and/or other modes such as a pneumatic load and/or a hydraulic load.

The power system 100 includes an exhaust system 118. In some examples, the exhaust system 118 includes a muffler and a tail pipe. The exhaust system 118 is configured to release exhaust gases from the engine 114 external to the enclosure 102 and reduce the sound of the engine 114 during operation.

Figure 3:
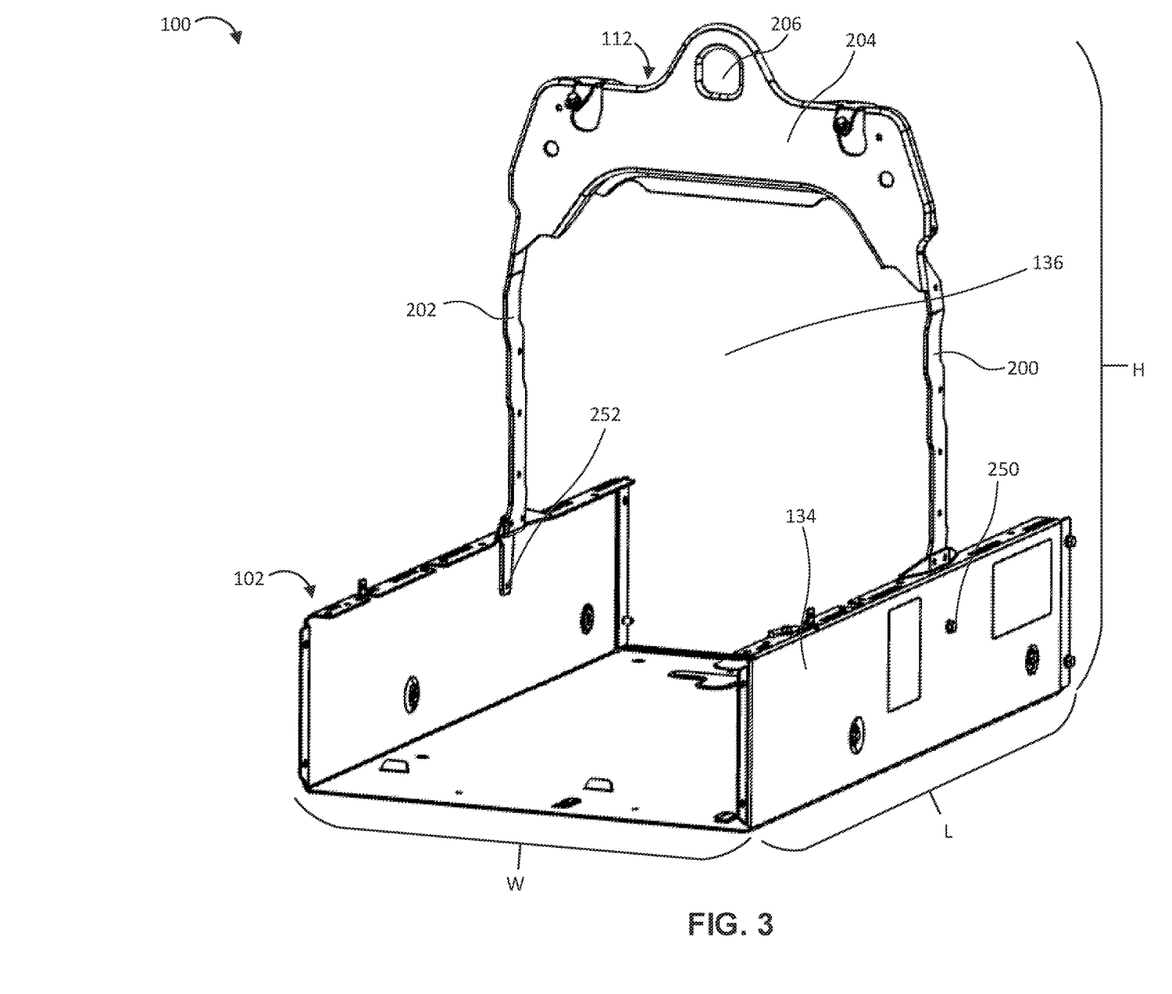
FIG. 3 is a perspective view of the power system including the lift structure with some of the surfaces of the enclosure and the components of the power system removed for ease of description and clarity.

FIG. 3 is a perspective view of the power system 100 including the lift structure 112 with some of the surfaces of the enclosure 102 and the components of the power system 100 (e.g., the engine, 114, the generator 116, etc.) removed for ease of description and clarity. The lift structure 112 is coupled to a base 134 of the power system 100. For example, a first leg 200 and a second leg 202 of the lift structure 112 may be coupled to the base 134. The first and second legs 200, 202 may be coupled to the base 134 in any suitable manner. In some examples, the first and second legs 200, 202 may be coupled to the base 134 via a mechanical connection such as bolts, screws, or another mechanical fastener. In other examples, the first and second legs 200, 202 may be connected to the base 134 in a different manner. For instance, in some cases, the first and second legs 200, 202 may be welded to the base 134.

In some examples, the base 134 may be part of the enclosure 102. The base 134 is configured to support one or more components of the power system 100. For example, the base 134 may support the engine 114, the generator 116, the welding-type conversion circuitry 120, the air compressor 122, the hydraulic pump 124, and/or the auxiliary power conversion circuitry 126. In other examples, the base 134 may have a different configuration than that illustrated in FIG. 3 and/or the lift structure 112 may be coupled to a different portion of the power system 100 (e.g., a different surface of the enclosure 102).

The lift structure 112 includes the first leg 200, the second leg 202, and a cross member 204. In some examples, the cross-member 204 defines an aperture 206. As shown in FIG. 1, the portion of the cross member 204 including the aperture 206 may be external to the enclosure 102. In this way, a cable or a lift truck fork may be able to be inserted through the aperture 206 to move the power system 100. In examples in which the cross member 204 does not include the aperture 206, the power system 100 may be lifted by the lift structure 112 in a different manner. In some examples, a different structure, such as another structure including an aperture, may be coupled to the lift structure 112 such that a cable or a lift truck fork may be able to be inserted through the aperture to move the power system 100. The lift structure 112 is capable of supporting the weight of the power system 100 when lifted by the lift structure 112 (e.g., by the aperture 206 of the lift structure 112). In some cases, the lift structure 112 may be capable of supporting a load that is heavier than the weight of the power system 100 alone. For example, the lift structure 112 may be capable of supporting the weight of the power system 100 and additional weight such as the weight of a trailer, gas bottles, weld cables, running gear, etc. In some examples, the remainder of the lift structure 112 (e.g., the rest of the cross member 204, the first leg 200, and the second leg 202) may be within the enclosure 102.

As seen in FIG. 3, the shape of the lift structure 112 leaves an open space 136 in the enclosure 102 when the lift system 112 is installed within the enclosure 102. In turn, components of the power system 100, such as the engine 114 and/or the generator 116, may be installed in the open space 136. In other words, the lift structure 112 may at least partially surround one or more components of the power system 100, thereby maximizing the use of space of the power system 100. For example, the lift structure 112 may at least partially surround one or more of the engine 114, the generator 116, the welding-type conversion circuitry 120, the air compressor 122, the hydraulic pump 124, and/or the auxiliary power conversion circuitry 126. In this way, the lift structure 112 as described herein can be included in the power system 100 without increasing the size of the power system 100.

In some examples, the lift structure 112 may be aligned with a center of mass of the power system 100. For example, the aperture 206 of the cross member 204 may be above the center of mass of the power system 100. Such a configuration may make lifting the power system 100 via the lift structure 112 easier. For example, having the lift structure 112 aligned with the center of mass of the power system 100 may prevent the power system 100 from being imbalanced when lifted via the lift structure 112. Such a configuration may also extend the useful life of the lift structure 112. For instance, the lift structure 112 may be less likely to be damaged during lifting if the lift structure 112 is aligned with the center of mass of the power system 100.

FIGS. 4A-4E are perspective views of the lift structure 112 including the first leg 200, the second leg 202, and the cross member 204. In some examples, the lift structure 112 is made of steel. In other examples, the lift structure 112 may be made of a different material. Regardless of the material the lift structure 112 is made out of, the example lift structure 112 is a one piece component. In other words, the lift structure 112 is a unitary component that does not include welds, fasteners, couplings, adhesive, etc. to couple the parts of the lift structure 112 (e.g., the first leg 200, second leg 202, the cross member 204, etc.) together. The one piece structure of the lift structure 112 described herein may make the lift structure 112 stronger than conventional multi-piece lift structures. Additionally, or alternatively, the one piece lift structure 112 may be easier, less time consuming, less expensive, and less wasteful to manufacture in comparison to conventional multi-piece lift structures.

The lift structure 112 includes the cross member 204. The cross member 204 may be a top portion of the lift structure 112 that extends across at least a portion of a width W (as illustrated in FIG. 3) of the power system 100. As discussed above, in some examples, the cross member 204 defines the aperture 206. In some examples, the aperture 206 may be in the center of the cross member 204. This may enable the aperture 206 to be aligned with the center of mass of the power system 100 when installed in the power system 100. In some cases, the aperture 206 may be located vertically relative to the majority of the cross member 204. For example, the cross member 204 may include a loop portion 218 including the aperture 206 that extends upward relative to the rest of the cross member 204. In this way, the loop portion 218 including the aperture 206 may be able to extend external to the enclosure 102 while the rest of the cross member 204 is within the enclosure 102. In other examples, the aperture 206 may be on a different portion of the cross member 204 or the cross member 204 may not include the loop portion 218 extending vertically relative the rest of the cross member 204. In yet other examples, the cross member 204 may not include an aperture 206.

Figure 4A:
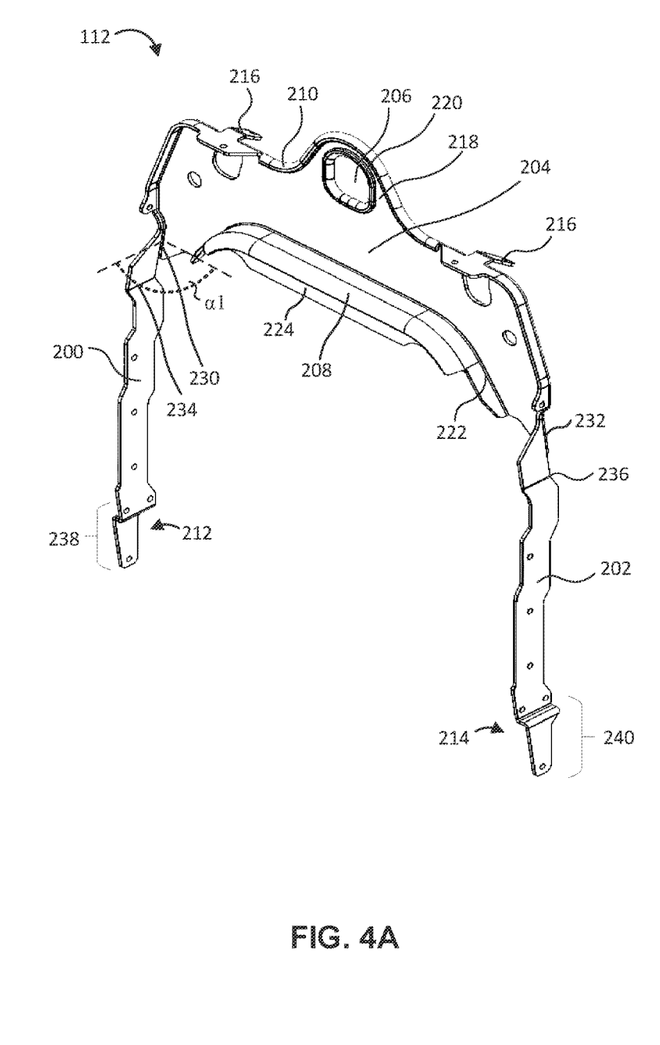
FIGS. 4A-4E are perspective views of the lift structure including the first leg, the second leg, and the cross member.
Figure 4B:
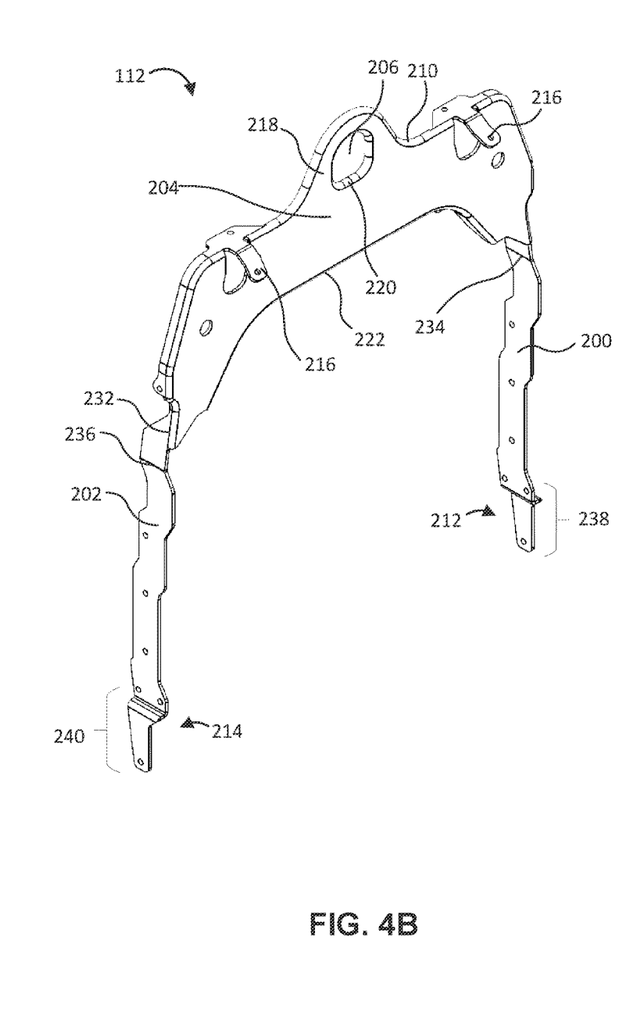
Figure 4C:
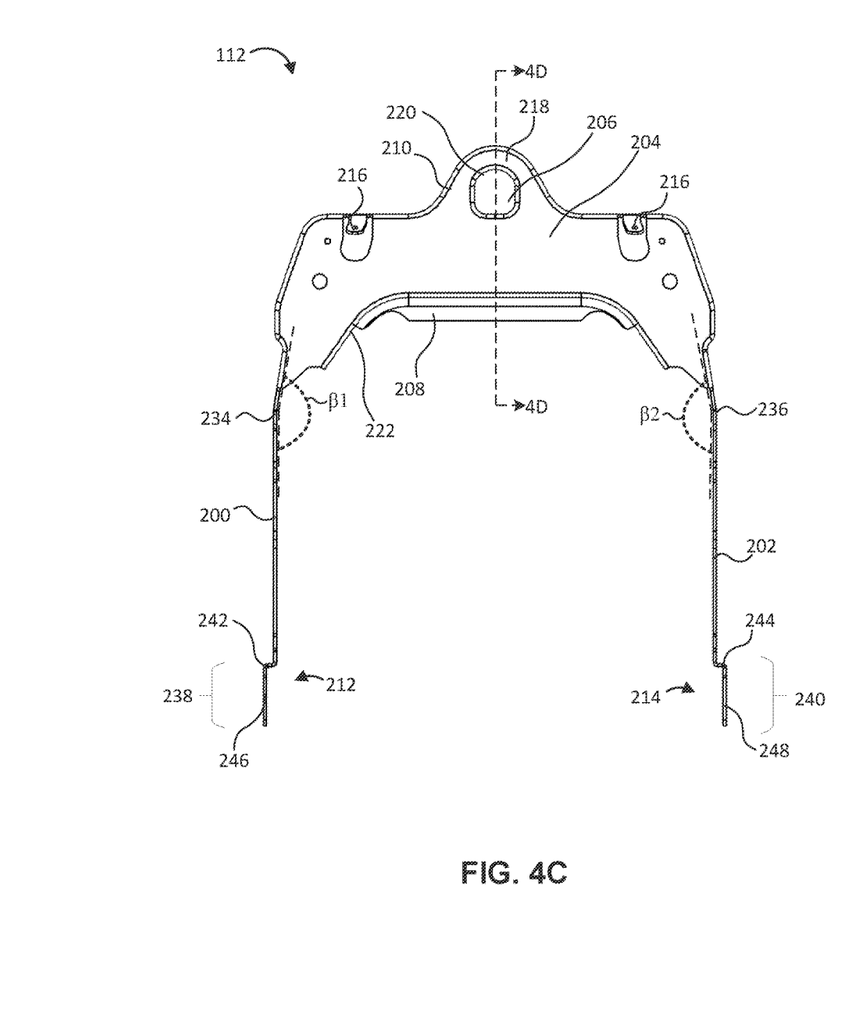
Figure 4D:
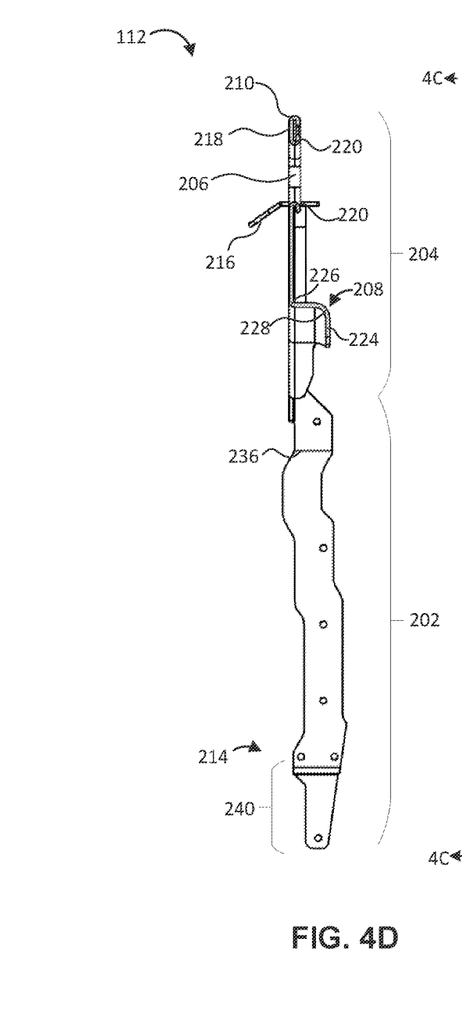
Figure 4E:
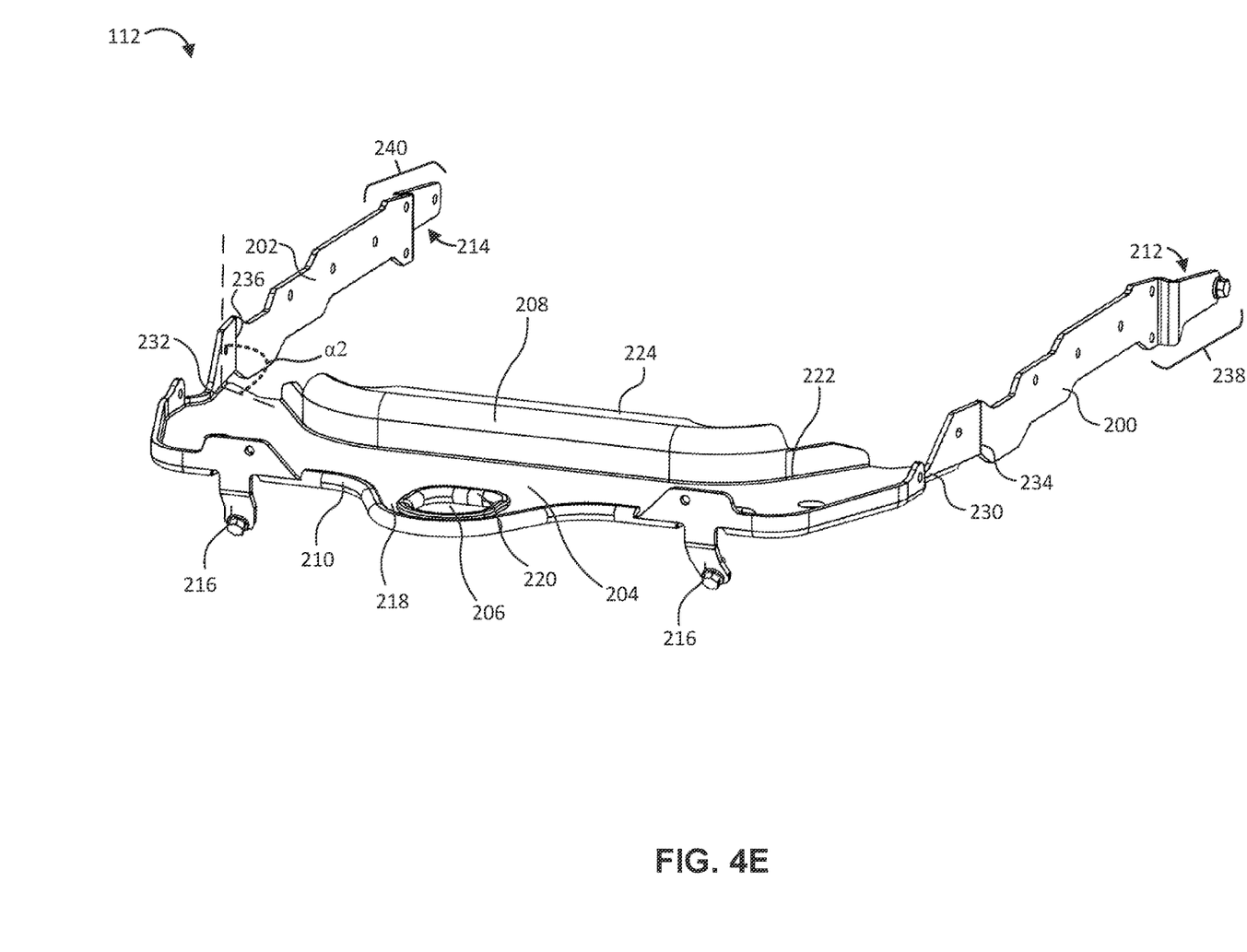

In some examples, at least a portion of a top edge 210 of the cross member 204 includes a bend. For example, the bend may extend along the width of the top edge 210 of the cross member 204. In such examples, as seen in FIG. 4D, the bend of the top edge 210 may be at least a 120 degree bend. For example, the bend of the top edge 210 may be between about 160 degrees and about 170 degrees. In other examples, the bend may define a different angle. The bend may extend along the entirety of the top edge 210 of the cross member 204. In other examples, the bend may only be on a portion of the top edge 210 of the cross member 204. For example, in some cases, the bend may be on the portion of the top edge 210 that corresponds to the loop portion 218 of the cross member 204. In any case, the top edge 210 including the bend may be stronger than a cross member 204 not including a top edge 210 with the bend. In turn, the lift structure 112 may be stronger and more resistant to bending and/or breaking when the power system 100 is lifted via the lift structure 112. In some examples, other edges (e.g., a side edge) of the cross member 204 may additionally or alternatively include a bend. Additionally, or alternatively, a perimeter 220 of the aperture 206 may also define a bend. In some such examples, the bend may be at least 120 degree bend. For example, the bend of the perimeter 220 may be between about 160 degrees and about 170 degrees. In other examples, the perimeter 220 of the aperture 206 may define a bend having a different angle. Similar to the bend along the top edge 210 of the cross member 204, the perimeter 220 defining a bend may increase the strength of the loop portion 218.

In some examples, a bottom edge 222 of the cross member 204 may include a Z-shaped bend 208 that defines an offset flange 224. For example, the Z-shaped bend 208 includes a first corner 226 in a first direction and a second corner 228 in a second direction different than the first direction. In some examples, the first direction may be opposite of the second direction. In some examples, the first corner 226 and the second corner 228 may each be 90 degree bends. In other examples, one or both of the first corner 226 or the second corner 228 may be an angle other than 90 degrees. The Z-shaped bend 208 defines the offset flange 224. In some examples, the offset flange 224 is substantially perpendicular to the portion of the Z-shaped bend 208 between the first and second corners 226, 228. The portion of the cross member 204 between the aperture 206 and the first corner 226 may also be substantially perpendicular to the portion of the Z-shaped bend 208 between the first and second corners 226, 228. In this way, the portion of the cross member 204 between the aperture 206 and the first corner 226 may be parallel to the offset flange 224. The cross member 204 described herein including the Z-shaped bend 208 may be stronger than a cross member 204 not including the Z-shaped bend 208. In this way, the Z-shaped bend 208 increases the strength of the cross member 204. In turn, the cross member 204 described herein may be more resistant to bending or breaking when the power system 100 is lifted via the lift structure 112 as compared to a lift structure 112 not including the Z-shaped bend 208.

In some cases, the cross member 204 may include additional or alternative features, such as attachment features, apertures, bends, flanges, etc. For example, the cross member 204 illustrated in FIGS. 4A-4E include attachment features 216. The attachment features 216 are configured to be coupled to the enclosure 102 of the power system 100. In some examples, the attachment features 216 may be attached the enclosure 102 in a visibly discrete manner. For example, in some cases, the attachment features 216 may be internally attached to the enclosure 102. In such examples, the top surface 106 may include a panel to permit access to the attachment features 216 but the attachment features 216 may be out of view when the panel is closed. Such configurations may be more aesthetically pleasing than power systems including exposed attachment features. In other examples, the attachment features 216 may be configured differently and/or the cross member 204 may include additional or alternative features.

The lift structure 112 also includes first and second legs 200, 202. Because the lift structure 112 is a unitary, single piece structure, the lift structure 112 may include various bends to orient parts of the lift structure 112, such as the first and second legs 200, 202, as desired. For example, the first leg 200 includes a first bend 230 and a second bend 234. The first bend 230 may orient the first leg 200 relative to the cross member 204. The first bend 230 may define an angle $\alpha 1$ of about 110 degrees, about 100 degrees, about 90 degrees, about 80 degrees, or about 70 degrees. In some examples, the angle $\alpha 1$ is 85 degrees to 95 degrees. For example, the angle $\alpha 1$ may be about 90 degrees. The angle $\alpha 1$ may be between the cross member 204 and the first leg 200. Thus, the first leg 200 (or at least a portion thereof) may be perpendicular to the cross member 204.

In some examples, the first bend 230 may orient the first leg 200 relative to the cross member 204 but may result in the first leg 200 not being vertical. Without the first leg 200 being vertical, the lift structure 112 may not be able to couple to the enclosure 102, may not properly distribute a load when lifted by the aperture 106, or the like. Therefore, the first leg 200 includes the second bend 234 relatively close to the cross member 204 (e.g., along the first leg 200) that vertically orients the first leg 200. In some examples, the second bend 234 may define an angle $\beta 1$ is about 90 degrees to less than 180 degrees, such as, for example, between about 150 degrees and less than about 180 degrees. For example, in some cases, the angle $\beta 1$ may be about 160 degrees or about 170 degrees. In some examples, the angle $\beta 1$ may be about 171 degrees. In turn, the portion of the first leg 200 between the first bend 230 and the second bend 234 may be at about a 9 degree angle from vertical, and the second bend 234 results in the first leg 200 from the second bend 234 to a first end 212 of the first leg 200 being aligned with a vertical axis (e.g., 0 degrees from vertical). In this way, the cross member 204 may extend along the width of the power system 100 and be substantially parallel to the front and/or rear surfaces 108, 104 of the enclosure 102 and the first leg 200 may extend along the height H (as illustrated in FIG. 3) of the power system 100 and be substantially parallel with the side surfaces 110 of the enclosure 102, while being a single piece structure.

The first leg 200 further includes a first end 212. The first end 212 is configured to couple to the lift structure 112 to the base 134 of the power system 100. For example, the first end 212 may be configured to couple to the base 134 via a first mechanical connection 250 (e.g., bolts, screws, etc.). In some examples, the first end 212 may include a first stepped portion 238. The first stepped portion 238 includes a first horizontal segment 242 and a first offset vertical segment 246. The first offset vertical segment 246 may be offset from the portion of the first leg 200 between the first horizontal segment 242 and the second bend 234. In some such examples, the bends that define the first stepped portion 238 may be a Z-shaped bend similar to the Z-shaped bend 108 of the cross member 104 (e.g., a bend in a first direction and a bend in a second direction opposite of the first direction).

In some examples, the first offset vertical segment 246 may be configured to receive a first mechanical connection 250 to couple the first leg 200 to the base 134 of the power system 100. In some such examples, the first horizontal segment 242 may be configured to interface with the base 134 of the power system 100 to reduce a load on the first mechanical connection 250 between the first leg 200 and the base 134. For example, the base 134 may be configured to land on (e.g., rest on, interface with, etc.) the first horizontal segment 242. In this way, engagement between the first leg 200 (e.g., the first end 212 of the first leg 200) and the base 134 may be increased. In turn, the first mechanical connection 250 between the first leg 200 and the first offset vertical segment 246 may be unloaded (e.g., subject to reduced loading). Unloading the first mechanical connection 250 may improve the integrity of the lift structure 112, thereby reducing the risk of failure of the first mechanical connection 250 and increasing the useful life of the lift structure 112.

The second leg 202 may the same or substantially the same as the first leg 200. For example, the second leg 202 may include a third bend 232 and a fourth bend 236. The third bend 232 may be substantially the same as the first bend 230. For instance, the third bend 232 may define an angle $\alpha 2$ the same or substantially the same as angle $\alpha 1$. The fourth bend 236 may be substantially the same as the second bend 234. For instance, the fourth bend 236 may define an angle $\beta 2$ the same or substantially the same as angle $\beta 1$. The second leg 202 may also include a second 214 that is the same or substantially the same as the first end 212 of the first leg 200. The second leg 202 includes a second end 214 with a second stepped portion 240 that is the same or substantially the same as the first stepped portion 238 of the first end 212. For example, the second stepped portion 240 includes a second horizontal segment 244 and a second offset vertical segment 248. The second stepped portion 240 may unload (e.g., subject to reduced loading) a second mechanical connection 252 between the second leg 202 and the base 134.

Figure 5:
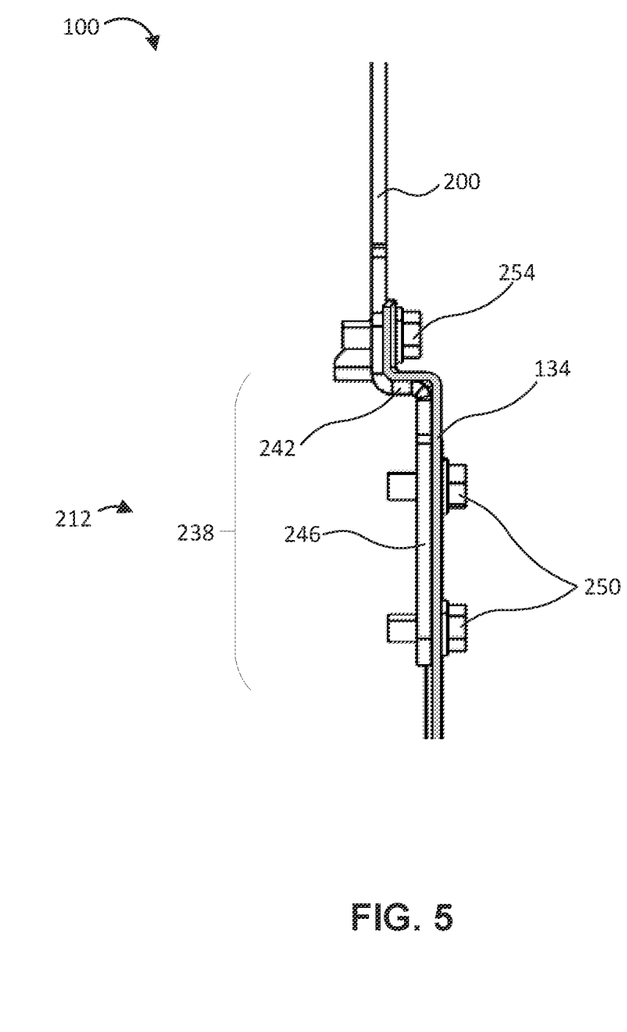
FIG. 5 is an enlarged view of a cross-section of the first leg coupled to the base via the first mechanical connection.

FIG. 5 is an enlarged view of a cross-section of the first leg 200 coupled to the base 134 via the first mechanical connection 250. As illustrated in FIG. 5, the base 134 is configured to land on (e.g., rest on, interface with, etc.) the first horizontal segment 242. Such a configuration may increase engagement between the first leg 200 (e.g., the first end 212 of the first leg 200) and the base 134, which may reduce the load on the first mechanical connection 250 between the first leg 200 and the first offset vertical segment 246. In turn, the risk of failure of the first mechanical connection 250 may be reduced and the useful life of the first mechanical connection 250 and/or the lift structure 112 may be increased in comparison to lift structures that are not configured to unload the first mechanical connection 250.

The first mechanical connection 250 may be any suitable mechanical connection. For example, the first mechanical connection 250 may include one or more bolts or screws. In other examples, the first mechanical connection 250 may include one or more additional or alternative types of mechanical connections. In yet other examples, the connection between the first leg 200 and the base 134 may be a different type of connection such as a weld, an adhesive bond, etc. In some examples, the first mechanical connection 250 may be the only coupling between the base 134 and the first leg 200. In other examples, such as the example illustrated in FIG. 5, there may be additional or alternative couplings between the base 134 and the first leg 200. For example, FIG. 5 illustrates a third mechanical connection 254 between the base 134 and the first leg 200. In examples in which there are multiple couplings between the base 134 and the first leg 200 (e.g., first and third mechanical connections 250, 254), one coupling may be on the first offset vertical segment 246 of the first stepped portion 238 (e.g., the first mechanical connection 250 illustrated in FIG. 5) and the other coupling may be on the first leg 200 above the first horizontal segment 242 (e.g., the third mechanical connection 254 illustrated in FIG. 5). Such a configuration may hold the base 134 in place relative to the first leg 200 (e.g., landing on the first horizontal segment 242) to unload the first mechanical connection 250. The second leg 202 may be coupled to the base 134 in the same or a similar manner as described with respect to the first leg 200.

Figure 6:
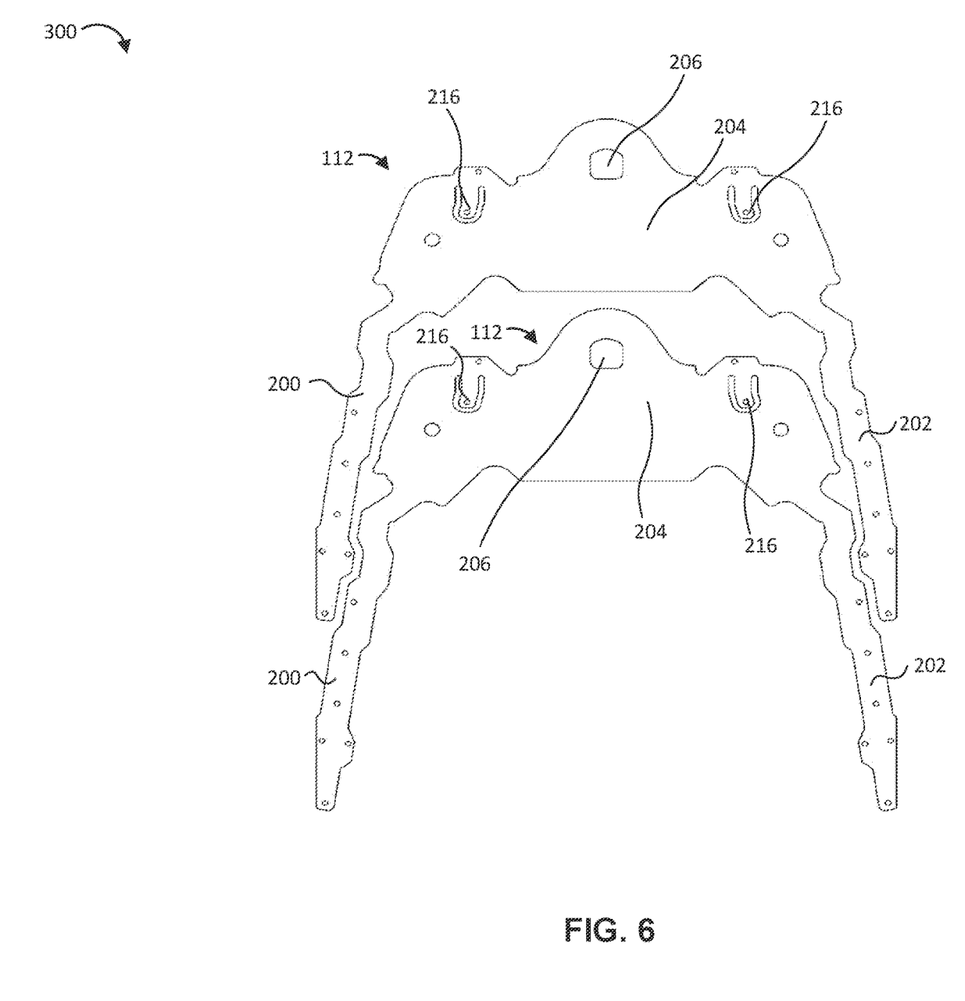
FIG. 6 is an example nested pattern for manufacturing the lift structure.

FIG. 6 is an example nested pattern 300 for manufacturing the lift structure 112. As discussed above, the lift structure 112 is a one piece structure free from welds, mechanical connections, etc. Because of the one piece design, the lift structure 112 may be produced using a progressive stamping method. For example, two or more lift structures 112 may be manufactured from a sheet of metal using the nested pattern 300 illustrated in FIG. 6. The lift structures 112 are nested (e.g., close in space, tucked into each other, etc.) which may increase the efficiency of manufacturing the lift structures 112. Moreover, more lift structures 112 may be able to be formed from the sheet of metal as compared to conventional, multi-piece lift structures. Additionally, or alternatively, the lift structures 112 formed using the nested pattern 300 may be result in less wasted material than conventional, multi-piece lift structures. For example, the nested pattern 300 of the lift structures 112 may maximize the use of the sheet of metal. Although the nested pattern 300 is illustrated having two lift structures 112, a nested pattern 300 may have any suitable amount of lift structures 112, such as three lift structures 112, four lift structures 112, or five or more lift structures 112.

The nested pattern 300 outlines various components and features of the lift structures 112 to be stamped out of a sheet of metal. For example, the nested pattern 300 defines the cross member 204, the aperture 206, the first leg 200, the second leg 202, and attachment features 216 of the lift structures 112. Certain features of the lift structures 112 may be formed after the progressive stamping method is used to define the features illustrated in FIG. 6. For example, the top edge 210 including a bend, the perimeter 220 of the aperture 206 including a bend, the first and second bends 230, 232, 234, 236 of the first and second legs 200, 202, the first and second ends 212, 214 including the first and second stepped portions 238, 240, and any other three dimensional aspects of the lift structures 112 may be defined after the respective lift structure 112 is stamped out of the sheet of metal.

As seen in FIG. 6, the first and second legs 200, 202 in the nested pattern 300 are angled with respect to a vertical axis. Such a configuration makes the nesting of the different lift structures 112 (e.g., being tucked into each other) possible. For example, if the legs 200, 202 were not at an angle with respect to the vertical axis in the nested pattern 300, the cross member 204 would not fit tucked into the preceding lift structure 112. Thus, as discussed above, the first and second legs 200, 202 include bends 230, 232, 234, 236 to orient the legs 200, 202 vertically and substantially parallel to the side surfaces 110 of the enclosure 102.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A system comprising:
   an enclosure comprising a base;
   a lift structure coupled to the base and comprising a first leg, a second leg, and a cross member, wherein the cross member, the first leg, and the second leg are a one piece structure, wherein the first leg comprises a first bend and the second leg comprises a second bend, wherein the first bend connects the cross member and the first leg, and the second bend connects the cross member and the second leg, wherein the first leg comprises a first stepped portion and the second leg comprises a second stepped portion, wherein the first stepped portion and the second stepped portion are configured such that the base contacts a top surface of each of the first stepped portion and the second stepped portion; and
   one or more of, within the enclosure:
      an engine;
      a generator configured to convert mechanical power to electrical power;
      welding-type conversion circuitry configured to convert electrical power to welding-type power;
      an air compressor configured to output compressed air;
      a hydraulic pump configured to generate hydraulic flow; or
      auxiliary power conversion circuitry configured to convert electrical to at least one of AC output power or DC output power.

2. The system of claim 1, wherein the cross member defines an aperture.

3. The system of claim 1, wherein the lift structure does not contain welds.

4. The system of claim 1, wherein the lift structure is capable of supporting a weight of the system when lifted by the lift structure.

5. The system of claim 1, wherein the first leg and the second leg of the lift structure are within the enclosure and at least a portion of the cross member is external to the enclosure.

6. The system of claim 1, wherein the lift structure is made of steel.

7. The system of claim 1, wherein the first bend of the first leg and the second bend of the second leg defines a first angle of 85 degrees to 95 degrees.

8. The system of claim 1, wherein the first leg comprises a third bend and the second leg comprises a fourth bend, and each of the third bend and the fourth bend defines an angle of 90 degrees to less than 180 degrees.

9. The system of claim 8, wherein the angle is 171 degrees.

10. The system of claim 1, wherein the lift structure is coupled to the base via a first mechanical connection at a first end of the first leg and a second mechanical connection at a second end of the second leg.

11. The system of claim 10, and wherein the first and second stepped portions are configured to reduce a load on the first and second mechanical connections.

12. The system of claim 11, wherein each of the first and second stepped portions define a horizontal segment having the corresponding top surface, and wherein the base is configured to land on the horizontal segment to unload the respective first and second mechanical connections and increase engagement between each of the first and second legs and the base.

13. The system of claim 1, wherein a top edge of the cross member comprises a bend extending lengthwise along the top edge of the cross member, wherein the bend is at least a 120 degree bend.

14. The system of claim 1, wherein a bottom edge of the cross member comprises a Z-shaped bend that defines an offset flange, wherein the Z-shaped bend comprises a first bend in a first direction and a second bend in a second direction different than the first direction.

15. The system of claim 14, wherein the second direction is opposite of the first direction.

16. The system of claim 14, wherein the Z-shaped bend increases a strength of the cross member.

17. The system of claim 1, wherein the lift structure is aligned with a center of mass of the system.

18. The system of claim 1, wherein the base is configured to support one or more of the engine, the generator, the welding-type conversion circuitry, the air compressor, the hydraulic pump, or the auxiliary power conversion circuitry.

19. The system of claim 1, wherein the lift structure at least partially surrounds one or more of the engine, the generator, the welding-type conversion circuitry, the air compressor, the hydraulic pump, or the auxiliary power conversion circuitry within the enclosure.

20. The system of claim 1, wherein the first stepped portion includes a first offset vertical segment and the second stepped portion includes a second offset vertical segment.

\* \* \* \* \*